(12) United States Patent
Strogov et al.

(10) Patent No.: US 11,601,443 B2
(45) Date of Patent: Mar. 7, 2023

(54) SYSTEM AND METHOD FOR GENERATING AND STORING FORENSICS-SPECIFIC METADATA

(71) Applicant: Acronis International GmbH, Schaffhausen (CH)

(72) Inventors: Vladimir Strogov, Moscow (RU); Oleg Ishanov, Moscow (RU); Alexey Dod, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 573 days.

(21) Appl. No.: 16/582,497

(22) Filed: Sep. 25, 2019

(65) Prior Publication Data
US 2021/0092135 A1 Mar. 25, 2021

(51) Int. Cl.
*H04L 9/40* (2022.01)
*G06F 11/14* (2006.01)

(52) U.S. Cl.
CPC ...... *H04L 63/1416* (2013.01); *G06F 11/1464* (2013.01); *G06F 11/1469* (2013.01); *H04L 63/1441* (2013.01); *G06F 2201/84* (2013.01)

(58) Field of Classification Search
CPC ............ G06F 11/1464; G06F 11/1469; G06F 2201/84; H04L 63/1416; H04L 63/144
See application file for complete search history.

(56) References Cited

U.S. PATENT DOCUMENTS

| | | | |
|---|---|---|---|
| 7,034,738 B1* | 4/2006 | Wang | G01S 7/021 342/13 |
| 8,533,818 B1* | 9/2013 | Ketterhagen | G06F 21/567 726/22 |
| 8,959,058 B1* | 2/2015 | Kleinschnitz | G06F 11/1458 707/661 |
| 9,280,667 B1* | 3/2016 | Keanini | G06F 21/577 |
| 9,405,904 B1* | 8/2016 | Fang | G06F 21/6272 |
| 10,346,610 B1* | 7/2019 | Natanzon | G06F 3/0623 |
| 10,438,000 B1* | 10/2019 | Gu | H04L 63/1466 |
| 10,609,066 B1* | 3/2020 | Nossik | H04L 63/1408 |
| 10,810,088 B1* | 10/2020 | Gu | G06F 11/1464 |
| 11,204,998 B2* | 12/2021 | Lancioni | G06F 21/563 |

(Continued)

*Primary Examiner* — Gary S Gracia
(74) *Attorney, Agent, or Firm* — ArentFox Schiff LLP; Michael Fainberg (57) ABSTRACT

Disclosed herein are systems and method for generating and storing forensics-specific metadata. In one aspect, a digital forensics module is configured to generate a backup of user data stored on a computing device in accordance with a backup schedule. The digital forensics module identifies, from a plurality of system metadata of the computing device, forensics-specific metadata of the computing device based on predetermined rules, wherein the forensics-specific metadata is utilized for detecting suspicious digital activity. The digital forensics module generates a backup of the forensics-specific metadata in accordance with the backup schedule and analyzes the forensics-specific metadata for an indication of the suspicious digital activity on the computing device. In response to detecting the suspicious digital activity based on the analysis, generates a security event indicating that the suspicious digital activity has occurred.

18 Claims, 5 Drawing Sheets

(56) References Cited

U.S. PATENT DOCUMENTS

| | | | |
|---|---|---|---|
| 11,316,900 B1* | 4/2022 | Schottland | H04L 63/0263 |
| 11,341,234 B1* | 5/2022 | Voss | G06F 11/1464 |
| 11,372,811 B1* | 6/2022 | Ciubotariu | G06F 21/565 |
| 11,477,232 B2* | 10/2022 | Kulaga | G06F 11/1464 |
| 2007/0169199 A1* | 7/2007 | Quinnell | H04L 63/1433 726/25 |
| 2012/0245650 A1* | 9/2012 | Lindgren | A61N 1/3702 607/25 |
| 2014/0283083 A1* | 9/2014 | Gula | H04L 63/1433 726/25 |
| 2014/0313882 A1* | 10/2014 | Rucker | H04W 24/04 370/219 |
| 2016/0134653 A1* | 5/2016 | Vallone | H04L 41/046 726/25 |
| 2017/0140156 A1* | 5/2017 | Gu | G06F 21/554 |
| 2017/0248118 A1* | 8/2017 | Ivers | F03D 1/0625 |
| 2017/0279836 A1* | 9/2017 | Vasseur | H04L 63/1425 |
| 2018/0212987 A1* | 7/2018 | Tamir | G06F 11/1461 |
| 2019/0042744 A1* | 2/2019 | Rajasekharan | G06F 21/565 |
| 2019/0065322 A1* | 2/2019 | Chakankar | G06F 16/27 |
| 2019/0236272 A1* | 8/2019 | Piatt | G06F 21/566 |
| 2019/0236274 A1* | 8/2019 | Brenner | G06F 21/6245 |
| 2019/0286534 A1* | 9/2019 | O'Mahony | G06F 11/1469 |
| 2019/0354443 A1* | 11/2019 | Haustein | G06F 11/1451 |
| 2019/0392146 A1* | 12/2019 | Gezalov | G06F 21/56 |
| 2020/0236085 A1* | 7/2020 | Spurlock | H04L 41/0896 |
| 2021/0044603 A1* | 2/2021 | Annen | G06F 11/1451 |
| 2021/0044604 A1* | 2/2021 | Annen | G06F 11/1484 |
| 2021/0092135 A1* | 3/2021 | Strogov | H04L 63/1441 |
| 2021/0203185 A1* | 7/2021 | Bennett | H02J 13/00002 |
| 2021/0312066 A1* | 10/2021 | Hansen | G06F 21/6218 |

* cited by examiner

SYSTEM AND METHOD FOR GENERATING AND STORING FORENSICS-SPECIFIC METADATA

FIELD OF TECHNOLOGY

The present disclosure relates to the field of data security, and, more specifically, to systems and methods for generating and storing forensics-specific metadata for the investigation of suspicious digital activity.

BACKGROUND

Data on a computing device may need to be restored for various reasons. For example, an operating system on a computing device may experience corruption and the system may need to retrieve an uncorrupted set of backup files as a replacement. Traditionally, backup copies are made only for the data that is needed to restore a user's system. This data may include installed applications, settings, documents, files, databases, etc.

As the reliance on digital computing has increased, the amount of cybercrimes such as hacking, data theft, and malware attacks, has followed suit. As a result, it has become necessary to save additional information about the data on a system when creating backup copies, which can be used to investigate these cybercrimes. Forensics engineers can utilize this additional information to determine the origins of an attack and detect remaining artifacts and traces of the attack on a system.

However, digital forensics investigations require urgency, time and manpower. A brute force approach to analyzing data item by item is ineffective because this approach involves multiple assumptions such as the untrusted objects not being deleted by an attacker and the authenticity of the data being analyzed. The time to complete an investigation using this approach is further dependent on the amount of data to analyze. For example, the time to review a significantly large hard drive may be exponentially greater than the time required for a smaller hard drive because investigators have far more files to review and may not necessarily know where to start the analysis. This approach can be even more discouraging when an investigation is inconclusive because the relevant data on a system has already been removed by the time an investigator begins the analysis because, for example, the computing device in question has been restarted, formatted, or damaged.

Therefore, there is a need for a method of generating and storing forensics-specific metadata that addresses the shortcomings described above.

SUMMARY

Aspects of the disclosure relate to the field of data security. In particular, aspects of the disclosure describe methods and systems for generating and storing forensics-specific metadata.

In one exemplary aspect, method for generating and storing forensics-specific metadata comprises a digital forensics module configured to generate a backup of user data stored on a computing device in accordance with a backup schedule. The digital forensics module identifies, from a plurality of system metadata of the computing device, forensics-specific metadata of the computing device based on predetermined rules, wherein the forensics-specific metadata is utilized for detecting suspicious digital activity. The digital forensics module generates a backup of the forensics-specific metadata in accordance with the backup schedule, wherein the backup of the forensics-specific metadata is stored separately from the backup of the user data. The digital forensics module analyzes the forensics-specific metadata for an indication of the suspicious digital activity on the computing device and in response to detecting the suspicious digital activity based on the analysis, generates a security event indicating that the suspicious digital activity has occurred.

In one aspect, the digital forensics module further marks subsequent user data backups of the backup schedule as potentially affected by the suspicious digital activity.

In one aspect, the digital forensics module further requests that a digital investigation be performed.

In one aspect, the digital forensics module further restores the computing device with a previous backup of the user data generated prior to the suspicious digital activity.

In one aspect, the digital forensics module further increases a frequency of generating backups in the backup schedule of the forensics-specific metadata.

In one aspect, the forensics-specific metadata comprises at least one of: an identifier of a running process, memory allocation information, an identifier of a running thread, security privilege information, registry information, an identifier of a hidden process, and an auto-run path on the computing device.

In one aspect, the digital forensics module generates a notarization identifier of the backup of the forensics-specific metadata, wherein the notarization identifier is one of: a blockchain transaction identifier, a hash value, a digital signature, or a checksum. The digital forensics module then stores the notarization identifier with the backup of the forensics-specific metadata.

In one aspect, the digital forensics module analyzes the forensics-specific metadata for the indication of the suspicious digital activity by first identifying a first backup of the forensics-specific metadata generated at a first time and a second backup of the forensics-specific metadata generated at a second time after the first time. The digital forensics module then detects, from the forensics-specific metadata, a process in the second backup that is not present in the first backup and determines whether the process is trusted. In response to determining that the process is not trusted, the digital forensics module detects the indication of the suspicious digital activity on the computing device.

In one aspect, the digital forensics module determines whether the process is trusted by comparing the process to a plurality of known trusted processes listed in a data structure and determining that no match between the process and a known trusted process in the plurality of known trusted processes exists.

In one aspect, the digital forensics module further identifies characteristics of the suspicious digital activity and identifies enhanced forensics-specific metadata based on those characteristics, wherein the enhanced forensics-specific metadata comprises characteristic-specific details of the suspicious digital activity. The digital forensics module then generates subsequent backups of the enhanced forensics-specific metadata (either additionally or alternatively to the original forensics-specific metadata).

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for generating and storing forensics-specific metadata. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
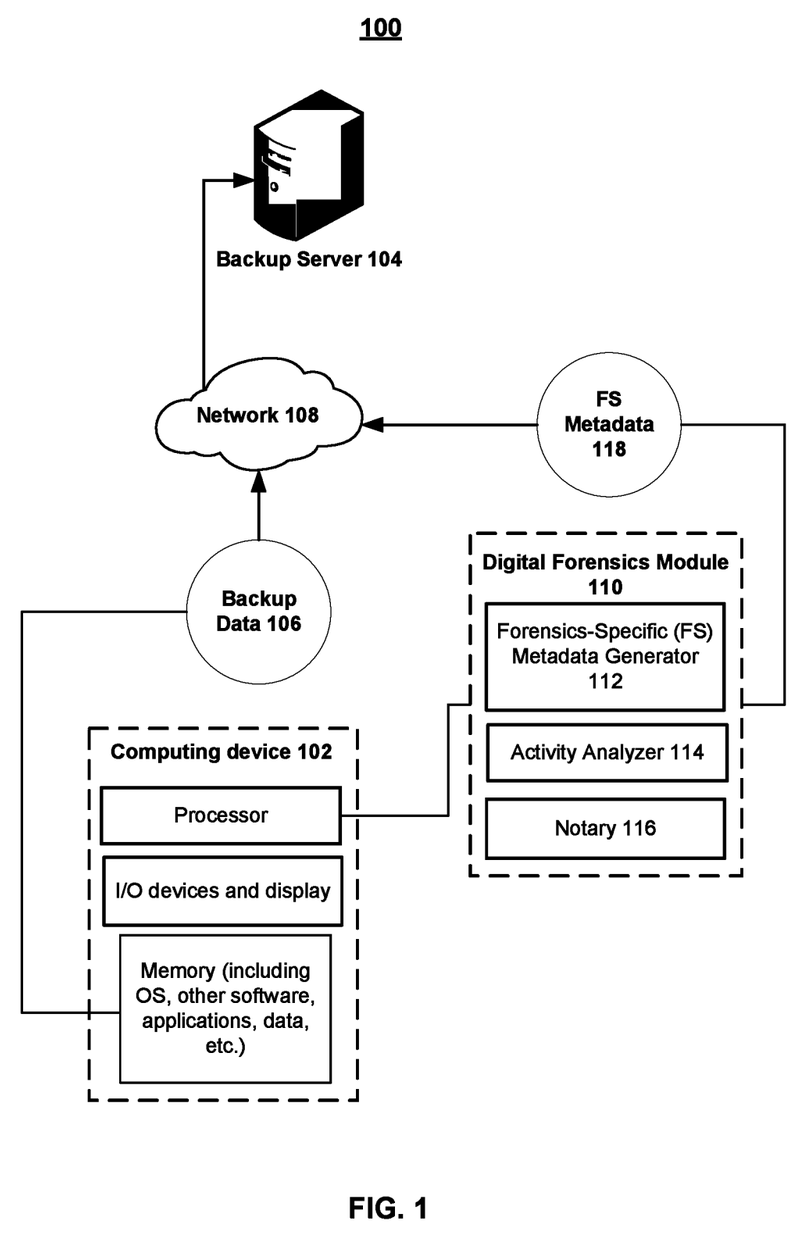
FIG. 1 is a block diagram illustrating a system for generating and storing forensics-specific metadata.

FIG. 1 is a block diagram illustrating system 100 for generating and storing forensics-specific metadata. The system 100 includes computing device 102, which may comprise a personal computer, server, etc., that includes a computer processing unit ("CPU"), and a memory that includes software for performing various tasks (e.g., Operating System (OS) software, application software, etc.). Data for computing device 102 may be stored in the memory of the device itself as well as on other external devices such as backup server 104, a compact disk, flash drive, optical disk, and the like.

In the present disclosure, backup data 106 originating from the memory of computing device 102 is transmitted to backup server 104 over network 108. Network 108 may be the Internet, a mobile phone network, a data network (e.g., a 4G or LTE network), Bluetooth, or any combination thereof. For example, backup server 104 may be part of a cloud computing environment accessed via the Internet, or may be part of a local area network (LAN) with computing device 102. The lines connecting backup server 104 and computing device 102 to network 108 represent communication paths, which may include any combination of free-space connections (e.g., for wireless signals) and physical connections (e.g., fiber-optic cables).

Figure 5:
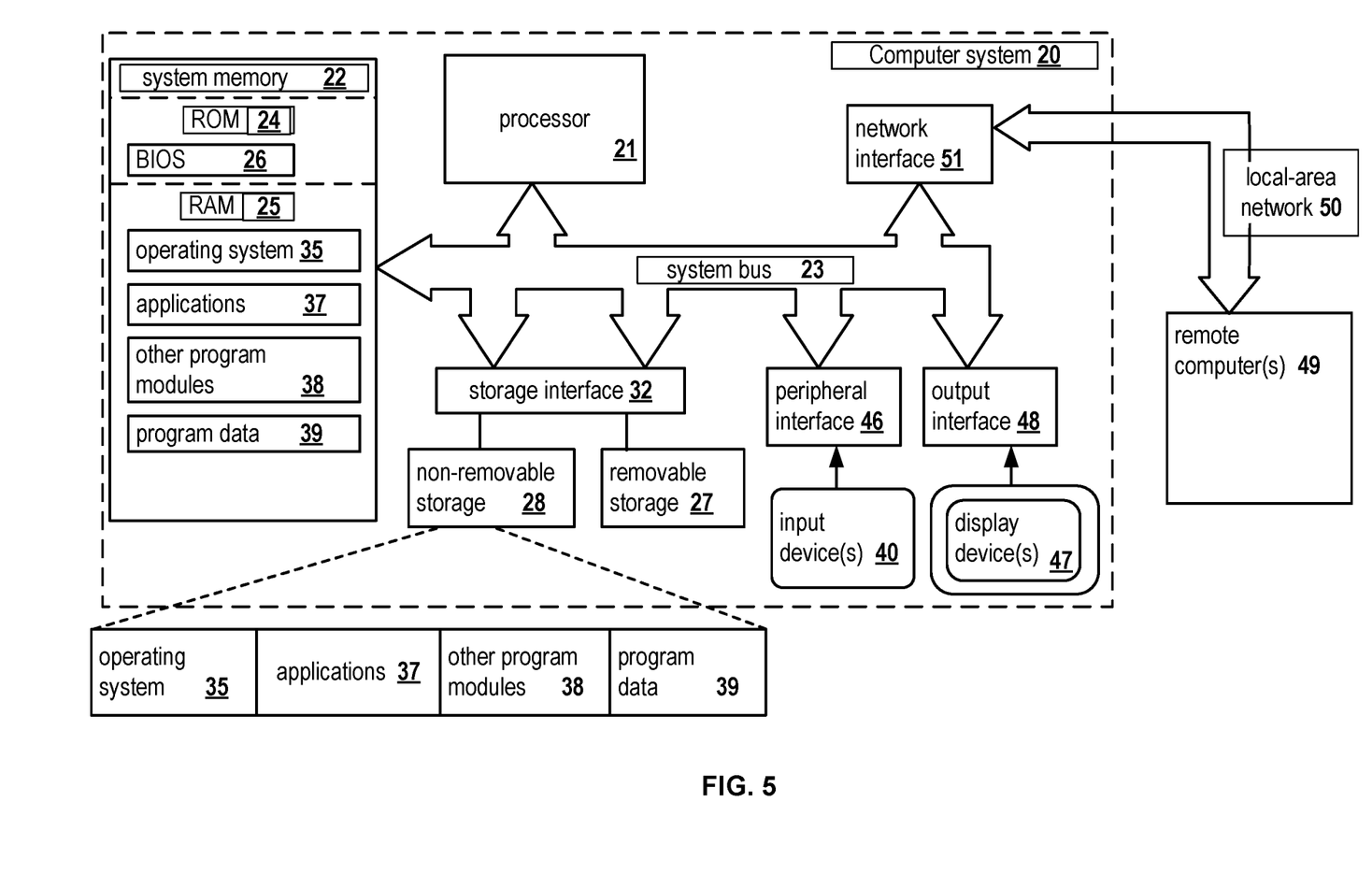
FIG. 5 presents an example of a general-purpose computer system on which aspects of the present disclosure can be implemented.

In should be noted that there may be more than one backup server 104, but only one is shown in FIG. 1 to avoid overcomplicating the drawing. For example, backup server 104 may represent a plurality of servers in a distributed cloud cluster. Backup server 104 may comprise any number of physical components (e.g., as shown in FIG. 5). For example, backup server 104 may comprise a number of physical components, e.g., processors, physical block storage devices (e.g., Hard Disk Drives (HDDs), Solid State Drives (SSDs), flash drives, SMR disks, etc.) or memory (e.g., Random Access Memory (RAM)), I/O interface components, etc.

Backup data 106 may be any type of data including user data, applications, system files, preferences, documents, media, etc. Computing device 102 may send backup data 106 for storage in backup server 104 in accordance with a backup schedule that indicates the specific data to include in backup data 106 and the frequency at which the data should be backed up. For example, computing device 102 may generate a copy of a data file existing in the memory of computing device 102 and transmit the copy as backup data 106 to backup server 104 every other hour. Backup data 106 may be selected by a user of computing device 102 and the frequency of the backup schedule may also be selected by a user.

As described above, although backing up data allows for the preservation of information on a system (e.g., computing device 102), defending against potential suspicious digital activities makes saving additional information about the data on computing device 106 necessary. Forensics engineers can utilize this additional information to determine the origins of a suspicious digital activity and detect remaining artifacts and traces of the suspicious digital activity on computing device 106. Because a forensics analysis may be time consuming as engineers must manually extract data and review all information item-by-item, there is a need for a method that reduces the time for evidence triage, provides access to evidence content without data unarchiving, and authenticates the data to ensure that the data is not corrupted.

Accordingly, the present disclosure provides a method for generating and storing forensics-specific metadata. Digital forensics module 110 comprises three components, namely: forensics-specific (FS) metadata generator 112, activity analyzer 114, and notary 116. Digital forensics module 110 may reside on computing device 102 and may be executed by the processor of computing device 102. Digital forensics module 110 may be a backup software divided as a thin client on computing device 102 and a thick client on backup server 104 (or vice versa). In some embodiments, digital forensics module 110 may reside on an external device, such as a server connected to computing device 102 over network 108 or a direct communication path (e.g., a USB cable).

In order to provide to a forensics engineer with the information needed to conduct a forensics analysis in an efficient manner, FS metadata generator 112 identifies the relevant data and metadata on computing device 102 that should be separately stored in an accessible archive. In some embodiments, FS metadata generator 112 may extract the metadata of backup data 106 and store it in backup server 104 as FS metadata 118. FS metadata 118 may include various pre-determined attributes of backup data 106 that are prone to change during a suspicious digital activity. Such attributes include the identification of backup data 106, a path to backup data 106, identification of processes utilizing backup data 106, and memory utilization associated with backup data 106.

FS metadata generator 112 may collect system information using various internal system functions and calls. Although collecting system information can be performed on any operating system, for the sake of brevity, the metadata collection functions and calls discussed in the present disclosure are specific to Windows™ operating systems. It should be noted that FS metadata generator 112 may employ comparable functions and calls to extract comparable metadata in any other operating system running on computing device 102.

FS metadata generator 112 may enumerate processes using any of the following functions: EnumProcesses, WTSEnumerateProcesses, CreateToolhelp32Snapshot, Process32First, Process32Next, NtQuerySystemInformation (SystemProcessAndThreadInformation).

FS metadata generator 112 may extract metadata such as name, description and company name of a specified file by Path via resource APIs: GetFileVersionInfoSize, GetFileVersionInfo, and VerQueryValue.

FS metadata generator 112 may extract metadata such as base address, size, and load count of a specified file via the function NtQuerySystemInformation (SystemProcessAndThreadInformation).

FS metadata generator 112 may extract metadata about memory usage of a specified process using the function GetProcessMemoryInfo.

FS metadata generator 112 may extract metadata such as command line and current directory information using the function NtQueryInformationProcess, where the function ReadProcessMemory is used to read from the Process Environment Block (PEB).

FS metadata generator 112 may extract metadata regarding a dynamic link library (DLL) file such as DLL base address, DLL size, and DLL loadcount using the function EnumProcessModules. Furthermore, FS metadata generator 112 may extract metadata regarding a DLL file such as name, description, and company name by Path via resource APIs: GetFileVersionInfoSize, GetFileVersionInfo, VerQueryValue.

FS metadata generator 112 may extract metadata regarding a process such as timing information using the function GetProcessTimes.

FS metadata generator 112 may extract metadata such as a list of all open handles for each process using the function NtQuerySystemInformation(SystemHandleInformation).

FS metadata generator 112 may extract metadata such as mitigation policy settings for a process (e.g., Address Space Layout Randomization (ASLR) policy or Control Flow Guard (CFG) policy) using the functions GetProcessMitigationPolicy(ProcessASLRPolicy) and GetProcessMitigationPolicy(ProcessControlFlowGuardPolicy), respectively.

FS metadata generator 112 may extract metadata such as a copy of the security descriptor for an object specified by a handle using the function GetSecurityInfo.

FS metadata generator 112 may extract metadata such as information about an access token using the function GetTokenInformation(TokenUser). An access token is created by a system such as computing device 102 when a user logs on. Every process executed on behalf of the user has a copy of the access token. The access token identifies the user, the user's groups, and privileges. FS metadata generator 112 may use the function PrivilegeCheck to determine whether an access token holds a specified set of privileges.

FS metadata generator 112 may extract metadata such as the priority class for a specified process along with the priority value of each thread of the process using the functions GetPriorityClass and GetThreadPriority, respectively.

FS metadata generator 112 may extract metadata of the services registered in a process such as service name, description, path and state. Likewise, FS generator 112 may extract metadata of threads such as TID, start time, kernel time, user time, stacktrace, and stackwalk using the functions CreateToolhelp32Snapshot, Thread32First and Thread32Next.

FS metadata generator 112 may extract metadata such as names of the programs that are initiated at startup by reading the values in the following registry keys:

HKEY_LOCAL_MACHINE\Software\Microsoft\
   Windows\CurrentVersion\Run
HKEY_LOCAL_MACHINE\Software\Microsoft\
   Windows\CurrentVersion\RunOnce
HKEY_LOCAL_MACHINE\Software\Microsoft\
   Windows\CurrentVersion\RunServices
HKEY_LOCAL_MACHINE\Software\Microsoft\
   Windows\CurrentVersion\RunServicesOnce
HKEY_LOCAL_MACHINE\Software\Microsoft\
   Windows NT\CurrentVersion\Winlogon\Userinit
HKEY_LOCAL_MACHINE\Software\Microsoft\
   Windows NT\CurrentVersion\Winlogon\Notify
HKEY_LOCAL_MACHINE\System\Current-
   ControlSet\Control\Session Manager\BootExecute
HKEY_CURRENT_USER\Software\Microsoft\
   Windows\CurrentVersion\Run
HKEY_CURRENT_USER\Software\Microsoft\
   Windows\CurrentVersion\RunOnce
HKEY_CURRENT_USER\Software\Microsoft\
   Windows\CurrentVersion\RunServices
HKEY_CURRENT_USER\Software\Microsoft\
   Windows\CurrentVersion\RunServicesOnce
HKEY_CURRENT_USER\Software\Microsoft\
   Windows NT\CurrentVersion\Windows
HKEY_LOCAL_MACHINE\Software\Microsoft\
   Windows\CurrentVersion\Policies\Explorer\Run
HKEY_CURRENT_USER\Software\Microsoft\
   Windows\CurrentVersion\Policies\Explorer\Run
HKEY_CURRENT_USER\Software\Microsoft\
   Windows NT\CurrentVersion\Windows\load
HKEY_LOCAL_MACHINE\Software\Microsoft\
   Windows NT\CurrentVersion\Windows
HKEY_LOCAL_MACHINE\SOFTWARE\
   Microsoft\Windows
   NT\CurrentVersion\Winlogon\Notify
HKEY_CURRENT_USER\Software\Microsoft\
   Windows NT\CurrentVersion\Winlogon\Shell
HKEY_LOCAL_MACHINE\Software\Microsoft\
   Windows NT\CurrentVersion\Winlogon\Shell
HKEY_LOCAL_MACHINE\SOFTWARE\Microsoft\
   Windows\CurrentVersion\ShellServiceObject-
   DelayLoad FS metadata generator 112 may extract metadata using a forensics tool such as the Volatility Framework™. For example, FS metadata generator 112 may extract information on hidden processes using the command "psxview," may scan memory for loaded, unloaded, and unlinked drivers using the command 'modscan' or "moddump," may find API/DLL function hooks using the command "apihooks," may find hooks in a system service descriptor table using the command "ssdt," may identify I/O request packet (IRP) hooks using the command "driverirp," and may extract the interrupt descriptor table using the command "idt," may extract the command history buffer using the command "cmdscan," may extract console information using the command "consoles," may identify services registered in a system using the command "svcscan."

FS metadata generator 112 may extract metadata such as network socket information (e.g., a list of TCP/UDP endpoints available to an application) using the functions GetExtendedTcpTable and GetExtendedUdpTable.

FS metadata generator 112 may extract metadata such as the master file table (MFT) records detailing information about a file on an NTFS file system volume, including its size, time and date stamps, permissions, and data content.

FS metadata generator 112 may extract metadata detailing the set of existing logon session identifiers (LUIDs), the number of sessions and information about a specified logon session using the functions LsaEnumerateLogonSessions and LsaGetLogonSessionData.

FS metadata generator 112 may extract metadata such as windows event logs using the function ReadEventLog.

FS metadata generator 112 may extract metadata such as a file list of recycle bin contents using the functions SHGetDesktopFolder and SHGetSpecialFolderLocation(CSIDL_BITBUCKET).

FS metadata generator 112 may extract metadata such as the IPv4 to physical address mapping table using the function GetIpNetTable.

FS metadata generator 112 may extract metadata such as DNS cache information using the function DnsQuery (DNS_QUERY_NO_WIRE_QUERY).

FS metadata generator 112 may generate a screenshot using the functions CreateCompatibleDC, CreateCompatibleBitmap, StretchBlt, BitBlt, and GetDIBits.

Additional metadata that FS metadata generator 112 may extract is computer name, domain name, time zone, environment variables, signatures and certificates. To determine metadata such as hashes, entropy profile, and strings, FS metadata generator 112 may employ special calculation and search methods.

FS metadata generator 112 may generate FS metadata 118. FS metadata 118 may be a data structure (e.g., an array) that aggregates any combination of the metadata previously described. For example, a first field of the data structure may indicate the name of the data file, a second field of the data structure may indicate the path of the data file, and so on.

FS metadata generator 112 may generate FS metadata 118 based on predetermined rules for selecting a combination of the metadata described above and periodically collecting this information for backup. These predetermined rules may be stored in memory of computing device 102 or backup server 104. In one aspect, a rule may indicate that depending on the state of computing device 102 (e.g., suspicious activity detected or no suspicious activity detected), to retrieve a certain set of the metadata described above. For example, a rule may specify that when suspicious activity is not detected, to collect at least one of: identifiers of running processes, memory allocation information, identifiers of running threads, security privilege information, registry information, identifiers of hidden processes, and auto-run paths on the computing device. If suspicious activity is detected, an additional set of metadata may be included in the list of forensics-specific metadata such as identifiers of idle processes, identifies of idle threads, etc., according to the predetermined rule. Another rule may indicate to reduce the number of types of forensics-specific metadata to retrieve for backup depending on whether computing device 102 is inactive (e.g., in sleep mode). Yet another rule may indicate to reduce the number of types of forensics-specific metadata to retrieve for backup if the amount of free space in backup server 104 reaches below a threshold amount of space. And yet another rule may indicate to reduce the number of types of forensics-specific metadata to retrieve for backup if the frequency of the backup schedule is higher than a threshold frequency (e.g., to ensure that the backup of forensics is not too processing or memory intensive). In terms of reduction, the rule may specify the exact number of metadata types to retrieve. For example, if by default 20 metadata types are being retrieved for backup, the rule may indicate to reduce the number to 10 metadata types.

Activity analyzer 114 analyzes the attributes of FS metadata 118 stored on computing device 102 and may serve as the first line of defense for detecting suspicious digital activity. For example, FS metadata 118 may comprise the enumerated processes executing on computing device 102 (e.g., retrieved by FS metadata generator 112 using the function EnumProcesses). Activity analyzer 114 may thus identify foreign processes that have not been executed by an authorized user of computing device 102. Activity analyzer 114 may also scan FS metadata 118 for foreign applications and data files that have not been installed by an authorized user of computing device 102. In response to detecting a foreign process, application or data file, activity analyzer 114 may generate a security event indicating suspicious digital activity on computing device 102. The security event represents a signal requesting that a digital investigation be performed. As mentioned before, any delays in reporting suspicious digital activity may be costly. By the time a forensics engineer may get to examine computing device 102, damage from a cyberattack may already have been performed. Accordingly, in response to finding an indication of suspicious digital activity, a security event is immediately generated. The security event may, for example, be an alert to the user of computing device 102 that suspicious activity is detect.

In one aspect, activity analyzer 114 may mark subsequent user data backups (e.g., backup data 106) of the backup schedule as potentially affected by the suspicious digital activity. In one aspect, activity analyzer 114 may restore computing device 102 with a previous backup of backup data 106 generated prior to the suspicious digital activity. Specifically, activity analyzer 114 may transmit backup data 106 and FS metadata 118 to backup server 104, both with a marker indicating that suspicious digital activity has been detected, and may retrieve, from backup server 104, a prior copy of backup data 106 that does not feature the suspicious digital activity to replace at computing device 102. In one aspect, the digital forensics module further increases a frequency of generating backups in the backup schedule of the forensics-specific metadata.

Another aspect of the present disclosure is to verify the authenticity of the data being analyzed in a forensics analysis. Typically a forensics engineer extracts data from computing device 102, but it is possible that the data being extracted has been corrupted by the suspicious digital activity. It is also possible that computing device 102 underwent a change such as a shutdown or being formatted to an extent that a forensics engineer cannot generate accurate reports of the data. Therefore, there is a need to verify whether the data being analyzed is authentic and has not been altered in any way.

Notary 116 may generate a notarization identifier of the backup of the forensics-specific metadata, wherein the notarization identifier is one of: a blockchain transaction identifier, a hash value, a digital signature, or a checksum. Notary 116 may then store the notarization identifier with the backup of the forensics-specific metadata. For example, notary 116 may generate hash values of FS metadata 118 in computing device 102 to enable this verification process. When FS metadata 118 is being transmitted to backup server 104, notary 116 may utilize a cryptographic hash function to generate a hash value of FS metadata 118 and subsequently add the hash value to the backup. In some embodiments, computing device 102 may transmit backup data 106 and FS metadata 118 simultaneously to backup server 104. Thus, for any given backup data 106 on backup server 104, there exists FS metadata 118 with relevant metadata information about computing device 102 (including a corresponding hash value). By storing a notarization proof such as a blockchain transaction ID, the authenticity of the metadata is ensured.

Figure 2:
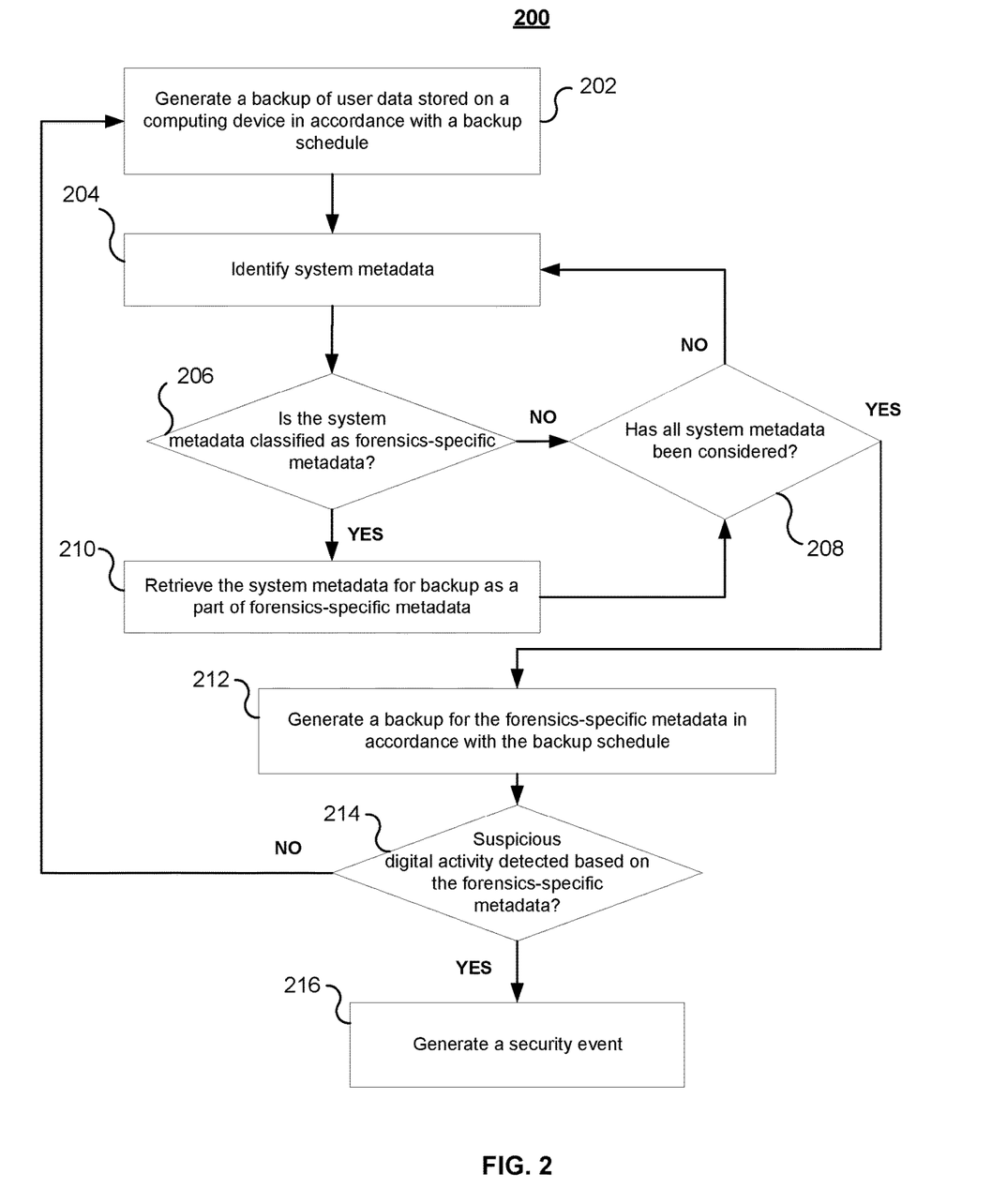
FIG. 2 illustrates a flow diagram of a method for generating and storing forensics-specific metadata, in accordance with aspects of the present disclosure.

FIG. 2 illustrates a flow diagram of method 200 for generating and storing forensics-specific metadata, in accordance with aspects of the present disclosure. At 202, FS metadata generator 112 generates a backup of user data stored on a computing device in accordance with a backup schedule. The backup data may include data files (e.g., photos, videos, documents, applications, etc.) and settings associated with the user. The backup schedule may require backing up the identified user data periodically (e.g., once per hour). At 204, FS metadata generator 112 identifies system metadata. In one example, suppose that the system metadata is idle threads information. This metadata may be a part of a list of system metadata that can be retrieved by FS metadata generator 112. Of course, retrieving all available system metadata can be processor and memory intensive, and can be a burden on a forensics engineer to review. Therefore, reducing the amount of metadata to backup is necessary and allows for improved visibility of suspicious digital activity when only forensics-specific metadata is considered.

At 206, FS metadata generator 112 determines whether the system metadata is classified as forensics-specific metadata. Referring to the previous example, FS metadata generator 112 may retrieve a list of predetermined rules, of which one may indicate that during normal activity (e.g., when no suspicious digital activity is detected), information about idle threads does not need to be stored as a part of forensics-specific metadata. In response to determining that the system metadata is not classified as forensics-specific metadata, method 200 advances to 208, where FS metadata generator 112 determines whether all system metadata has been considered (e.g., whether there is other unconsidered system metadata in the list of system metadata).

At 208, FS metadata generator 112 may determine that there is other system metadata to consider. As a result, method 200 returns to 204, where different system metadata is identified. For example, FS metadata generator 112 may consider identifiers of running processes on the computing device as system metadata. At 206, FS metadata generator 112 may determine that the identifiers of running processes are classified as forensics-specific metadata. Thus, at 210, FS metadata generator 112 retrieves the system metadata (e.g., the identifiers of running processes) for backup as a part of forensics-specific metadata. For example, FS metadata generator 112 may use the functions described above to enumerate running processes and collect their respective PIDs. From 210, method 200 returns to 208 so that other forensics-specific metadata may be retrieved.

If no other system metadata is to be considered at 208, method 200 advances to 212, where FS metadata generator 112 generates a backup for the forensics-specific metadata in accordance with the backup schedule. For example, FS metadata generator 112 may aggregate the retrieved forensics-specific metadata and upload it to backup server 104 via network 108.

At 214, activity analyzer 114 may determine whether suspicious digital activity has been detected based on the forensics-specific metadata. This is further discussed in the description of FIG. 3. In response to detecting the suspicious digital activity, at 216, activity analyzer 114 generates a security event. For example, activity analyzer 114 may signal a request for a digital investigation by a forensics engineer. If suspicious digital activity is not detected, method 200 returns to 202, where another cycle of backup begins.

Figure 3:
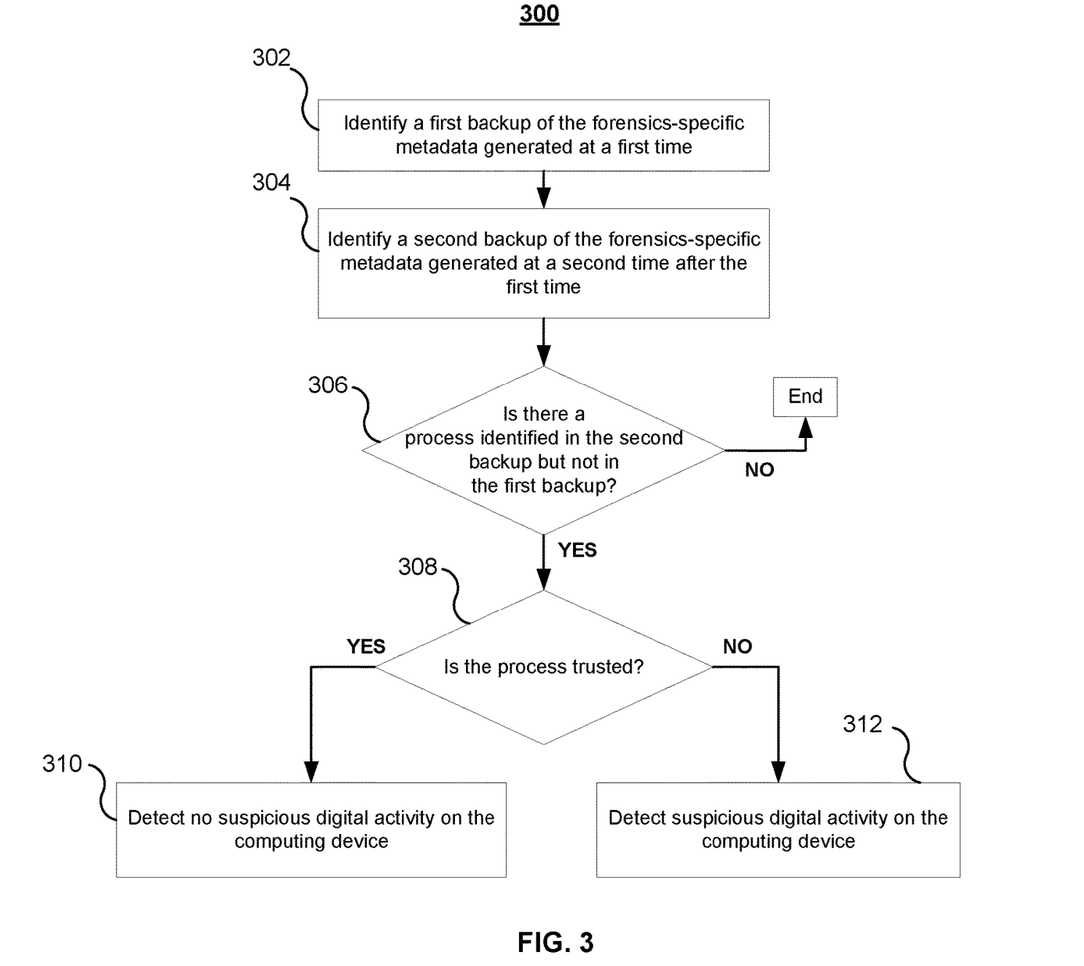
FIG. 3 illustrates a flow diagram of a method for detecting suspicious digital activity, in accordance with aspects of the present disclosure.

FIG. 3 illustrates a flow diagram of method 300 for detecting suspicious digital activity, in accordance with aspects of the present disclosure. At 302, activity analyzer 114 may identify a first backup of the forensics-specific metadata generated at a first time (e.g., in the previous cycle of the backup schedule). At 304, activity analyzer 114 identifies a second backup of the forensics-specific metadata generated at a second time after the first time (e.g., the current backup).

At 306, activity analyzer 114 compares the respective backups to identify a process that exists in the second backup and not in the first backup. If no such process is found, method 300 ends. In response to identifying such a process, activity analyzer 114 may determine whether the process is trusted. For example, activity analyzer 114 may determine whether the process is trusted by comparing the process to a plurality of known trusted processes listed in a data structure. In response to determining that no match between the process and a known trusted process in the plurality of known trusted processes exists, activity analyzer 114 may determine that the process is not trusted. Based on this, method 300 advances to 312, where activity analyzer 114 detects an indication of suspicious digital activity on the computing device.

If the process is in fact trusted (e.g., found in the list of trusted processes), method 300 instead advances to 310, where activity analyzer 114 detects no suspicious digital activity on the computing device.

Figure 4:
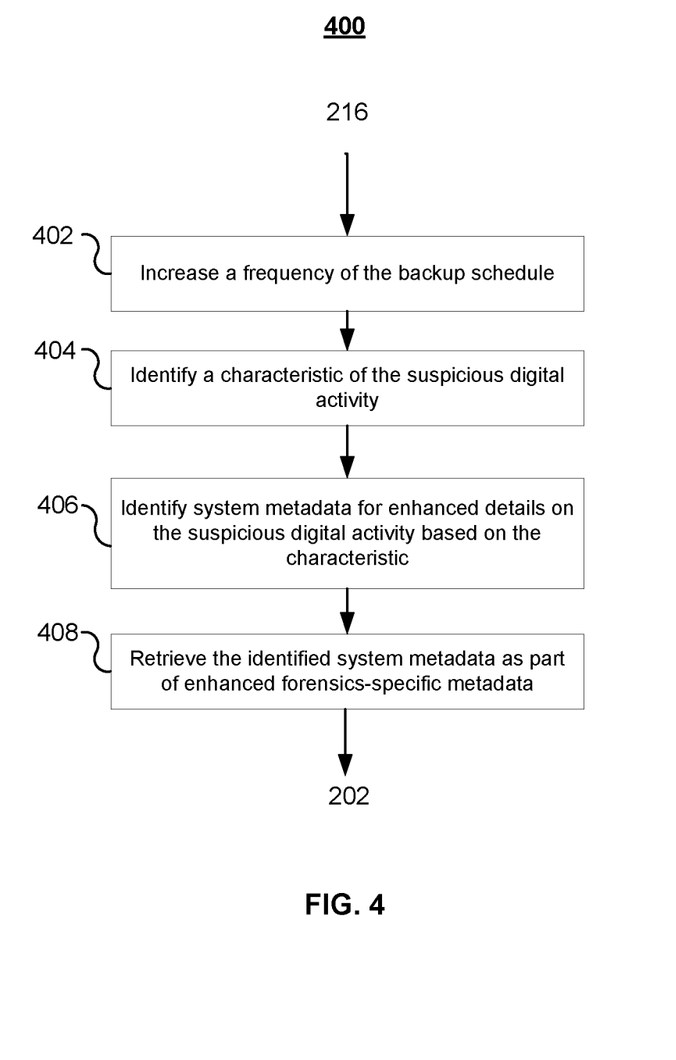
FIG. 4 illustrates a flow diagram of a method for updating the backup schedule based on the detection of suspicious digital activity, in accordance with aspects of the present disclosure.

FIG. 4 illustrates a flow diagram of method 400 for updating the backup schedule based on the detection of suspicious digital activity, in accordance with aspects of the present disclosure. Method 400 may be executed by digital forensics module 110 after activity analyzer 114 generates a security event at 216 of method 200. At 402, FS metadata generator 112 may increase a frequency of the backup schedule. Suppose that the frequency of the backup schedule is once every minute. It is possible that a full-fledged cyberattack has yet to occur and any detected suspicious digital activity is a component of a potential cyberattack. In order to improve the granularity of information for a forensics engineer performing a digital investigation, the frequency of backups and the amount of targeted details about the suspicious activities should increase. Accordingly, at 402, FS metadata generator 112 may increase the frequency of the backup schedule—specifically for forensics-specific metadata—to every 10 seconds (rather than every minute).

At 404, activity analyzer 114 may identify a characteristic of the suspicious digital activity. For example, the suspicious digital activity may be the running of a process that is untrusted. The characteristic of the suspicious digital activity may thus be the PID of the process. At 406, FS metadata generator 112 may identify system metadata for enhanced details on the suspicious digital activity based on the characteristic. For example, FS metadata generator 112 may initially retrieve the PIDs of running processes exclusively. In response to identifying the characteristic, FS metadata generator 112 may begin monitoring additional details about the untrusted process such as memory usage, security privileges and thread information.

At 408, FS metadata generator 112 retrieves the identified system metadata as part of an enhanced forensics-specific metadata. Method 400 then proceeds to 202 of method 200. Accordingly, during the second iteration of method 200 (e.g., after suspicious activity has been detected), subsequent backups of forensics-specific metadata will occur more frequently and with additional details about the suspicious digital activity (as a part of enhanced forensics-specific metadata).

FIG. 5 is a block diagram illustrating a computer system 20 on which aspects of systems and methods for storing and generating forensics-specific metadata may be implemented in accordance with an exemplary aspect. The computer system 20 may represent computing device 102 and/or backup server 104 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of methods 200-400 performed by digital forensics module 110 (e.g., via its components such as FS metadata generator 112) may be executed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for storing forensics-specific metadata, the method comprising:
generating a backup of user data stored on a computing device in accordance with a backup schedule;
identifying, from a plurality of system metadata of the computing device, forensics-specific metadata of the computing device based on predetermined rules, wherein the forensics-specific metadata is utilized for detecting suspicious digital activity;
generating a backup of the forensics-specific metadata in accordance with the backup schedule, wherein the backup of the forensics-specific metadata is stored separately from the backup of the user data;
analyzing the forensics-specific metadata for an indication of the suspicious digital activity on the computing device;
in response to detecting the suspicious digital activity based on the analysis, generating a security event indicating that the suspicious digital activity has occurred and increase the frequency of the backup schedule;
identifying characteristics of the suspicious digital activity;
identifying enhanced forensics-specific metadata based on the characteristics, wherein the enhanced forensics-specific metadata comprises characteristic-specific details of the suspicious digital activity;
performing at least one additional iteration of generating another backup of the enhanced forensics-specific metadata in accordance with the backup schedule; and
analyzing the enhanced forensics-specific metadata for additional information about the suspicious digital activity on the computing device to generate subsequent security events.

2. The method of claim 1, wherein generating the security event further comprises marking subsequent user data backups of the backup schedule as potentially affected by the suspicious digital activity.

3. The method of claim 1, wherein generating the security event further comprises requesting that a digital investigation be performed.

4. The method of claim 1, wherein generating the security event further comprises restoring the computing device with a previous backup of the user data generated prior to the suspicious digital activity.

5. The method of claim 1, wherein generating the security event further comprises increasing a frequency of generating backups in the backup schedule of the forensics-specific metadata.

6. The method of claim 1, wherein the forensics-specific metadata comprises at least one of:
an identifier of a running process,
memory allocation information,
an identifier of a running thread,
security privilege information,
registry information,
an identifier of a hidden process, and
an auto-run path on the computing device.

7. The method of claim 1, further comprising:
generating a notarization identifier of the backup of the forensics-specific metadata, wherein the notarization identifier is one of: a blockchain transaction identifier, a hash value, a digital signature, or a checksum; and
storing the notarization identifier with the backup of the forensics-specific metadata.

8. The method of claim 1, wherein analyzing the forensics-specific metadata for the indication of the suspicious digital activity comprises:
identifying a first backup of the forensics-specific metadata generated at a first time and a second backup of the forensics-specific metadata generated at a second time after the first time;
detecting, from the forensics-specific metadata, a process in the second backup that is not present in the first backup; and
determining whether the process is trusted; and
in response to determining that the process is not trusted, detecting the indication of the suspicious digital activity on the computing device.

9. The method of claim 8, wherein determining whether the process is trusted comprises:
comparing the process to a plurality of known trusted processes listed in a data structure; and
determining that no match between the process and a known trusted process in the plurality of known trusted processes exists.

10. A system for storing forensics-specific metadata, the system comprising:
a hardware processor configured to:
generate a backup of user data stored on a computing device in accordance with a backup schedule;
identify, from a plurality of system metadata of the computing device, forensics-specific metadata of the computing device based on predetermined rules, wherein the forensics-specific metadata is utilized for detecting suspicious digital activity;
generate a backup of the forensics-specific metadata in accordance with the backup schedule, wherein the backup of the forensics-specific metadata is stored separately from the backup of the user data;
analyze the forensics-specific metadata for an indication of the suspicious digital activity on the computing device;
in response to detecting the suspicious digital activity based on the analysis, generate a security event indicating that the suspicious digital activity has occurred and increase the frequency of the backup schedule;
identify characteristics of the suspicious digital activity;
identify enhanced forensics-specific metadata based on the characteristics, wherein the enhanced forensics-specific metadata comprises characteristic-specific details of the suspicious digital activity;
perform at least one additional iteration of generating another backup of the enhanced forensics-specific metadata in accordance with the backup schedule; and
analyze the enhanced forensics-specific metadata for additional information about the suspicious digital activity on the computing device to generate subsequent security events.

11. The system of claim 10, wherein the hardware processor is further configured to generate the security event by marking subsequent user data backups of the backup schedule as potentially affected by the suspicious digital activity.

12. The system of claim 10, wherein the hardware processor is further configured to generate the security event by requesting that a digital investigation be performed.

13. The system of claim 10, wherein the hardware processor is further configured to generate the security event by restoring the computing device with a previous backup of the user data generated prior to the suspicious digital activity.

14. The system of claim 10, wherein the hardware processor is further configured to generate the security event by increasing a frequency of generating backups in the backup schedule of the forensics-specific metadata.

15. The system of claim 10, wherein the hardware processor is further configured to:
generate a notarization identifier of the backup of the forensics-specific metadata, wherein the notarization identifier is one of: a blockchain transaction identifier, a hash value, a digital signature, or a checksum; and
store the notarization identifier with the backup of the forensics-specific metadata.

16. The system of claim 10, wherein the hardware processor is further configured to analyze the forensics-specific metadata for the indication of the suspicious digital activity by:
identifying a first backup of the forensics-specific metadata generated at a first time and a second backup of the forensics-specific metadata generated at a second time after the first time;
detecting, from the forensics-specific metadata, a process in the second backup that is not present in the first backup; and
determining whether the process is trusted; and
in response to determining that the process is not trusted, detecting the indication of the suspicious digital activity on the computing device.

17. The system of claim 16, wherein the hardware processor is further configured to determine whether the process is not trusted by:
comparing the process to a plurality of known trusted processes listed in a data structure; and
determining that no match between the process and a known trusted process in the plurality of known trusted processes exists.

18. A non-transitory computer readable medium storing thereon computer executable instructions for storing forensics-specific metadata, including instructions for:
generating a backup of user data stored on a computing device in accordance with a backup schedule;

identifying, from a plurality of system metadata of the computing device, forensics-specific metadata of the computing device based on predetermined rules, wherein the forensics-specific metadata is utilized for detecting suspicious digital activity;

generating a backup of the forensics-specific metadata in accordance with the backup schedule, wherein the backup of the forensics-specific metadata is stored separately from the backup of the user data;

analyzing the forensics-specific metadata for an indication of the suspicious digital activity on the computing device;

in response to detecting the suspicious digital activity based on the analysis, generating a security event indicating that the suspicious digital activity has occurred and increase the frequency of the backup schedule;

identifying characteristics of the suspicious digital activity;

identifying enhanced forensics-specific metadata based on the characteristics, wherein the enhanced forensics-specific metadata comprises characteristic-specific details of the suspicious digital activity;

performing at least one additional iteration of generating another backup of the enhanced forensics-specific metadata in accordance with the backup schedule; and analyzing the enhanced forensics-specific metadata for additional information about the suspicious digital activity on the computing device to generate subsequent security events.

* * * * *